Patented July 9, 1929.

1,720,032

UNITED STATES PATENT OFFICE.

HARRY E. BROOKBY, OF CHICAGO, ILLINOIS.

CELLULAR PLASTER.

No Drawing. Application filed January 9, 1926. Serial No. 80,343.

This invention relates to the manufacture of light cellular heat and sound insulation products consisting essentially of gypsum and being of the same general type as, but an improvement upon, the products described in the patent to D. C. Sanford No. 230,151 of July 20, 1880. The products of my present invention possess a high structural strength and are of uniform texture besides possessing other desirable properties which will be hereinafter specified.

My investigations have led to the discovery that certain water-soluble, acid-reacting salts which effect the precipitation of hydrated silica in situ throughout the finished product and which silica, as the same ages, tends to become crystalline and further increases the structural strength and permanence of such product, can be advantageously employed as acid-reacting ingredients such as alum, sulphate of aluminum, etc. Furthermore, I have discovered that a small amount of a material, such as calcium hydroxide (slacked lime), imparts very desirable stabilizing properties not only to the dry prepared mixture from which the cellular gypsum product is prepared, but also to the said cellular gypsum product. Other differences and advantages of my invention as compared with those of the prior art are hereinafter set forth in connection with the description of the best mode of preparing and utilizing the products embodying my invention.

In carrying out my invention, in its preferred form, I employ materials comprising partially calcined gypsum (plaster of Paris) or its equivalents, including partially dehydrated calcium sulphate in such state that crystallization and hardening from plastic mixtures can be accomplished; a water-soluble carbonate such as an alkali-metal carbonate, preferably sodium bicarbonate, which liberates carbon dioxide gas when mixed with water in the presence of the gypsum; a second water-soluble substance, preferably a bi-valent metal compound of fluo-silicic acid and giving an acid reaction on hydrolysis, such as magnesium silicofluoride, which controls the liberation of the gas from the water-soluble carbonate in the plastic mass comprising gypsum and which, of itself, generates a gas thereby supplementing the gas evolved from the said carbonate; a foam-producing agent which, as the gases are liberated, is beaten into a foam which retains the gases that are formed in situ in the plastic mass, and in addition to the foregoing, calcium hydroxide that serves to stabilize the resultant cellular structure and substantially prevent efflorescence thereof as well as otherwise to improve the dry mixture employed to produce such structure.

Preferably I employ as the major ingredient of my new composition of matter a powdered partially calcined gypsum, commonly known as plaster of Paris, which has a low water carrying capacity, in order that the amount of water necessary to gauge the mixture to a fluid state may be minimized. As a consequence, there is present less excess water to be evaporated from the finished mass. As one of the gas liberating agents which impart a cellular structure to the final product, I employ a water-soluble carbonate which, when admixed with water in the presence of partially calcined gypsum, will evolve carbon dioxide gas. Sodium bicarbonate, which is a water-soluble carbonate, is especially satisfactory for this purpose because, by its use, it is possible to control and regulate, within narrow limits the rate of liberation therefrom of the carbon dioxide gas and but a minimum amount of the acid reacting ingredients is required to liberate substantially its entire content of carbon dioxide gas.

In order to ensure liberation of substantially all of the carbon dioxide gas from the sodium bicarbonate, as well as to control the rate of liberation so as to preclude a too rapid ebullition of the gas, which may result in unduly expanding the plastic mass, I employ, in combination with the gypsum and the water-soluble carbonate a water-soluble silicofluoride compound of a bi-valent metal, such as lead silicofluoride or magnesium silicofluoride which have been found very satisfactory for this purpose, but I prefer to use magnesium silicofluoride because it is available commercially at an economical price. Each of these silicofluoride compounds, of itself, is a gas generating agent which serves to aid in the production of the cellular structure by supplementing the action of the carbon dioxide gas liberated from the water-soluble carbonate. Moreover, a water-soluble silicofluoride compound of a bi-valent metal reacts with the sodium bicarbonate to liberate therefrom substantially all of the carbon dioxide. At the same time, a silicofluoride compound of a bi-valent metal will also serve to facilitate the control and regulation of the liberation of the carbon dioxide gas from the water-soluble carbonate. Again, both of these silicofluoride compounds are hardeners for the final cellular product.

As a foam producer I employ powdered soap bark or like saponaceous substances. As the gases are liberated within the plastic mass they beat the mass into a foam through the foaming action of the powdered soap bark. The gypsum particles adhere to the foam and the film enveloping the gaseous particles is so tenacious that the evolved gases are retained effectively within the mass in the form of minute bubbles. The persistent foam thus produced results solely from the inherent foam-producing property of soap bark and saponaceous substances generally.

As previously stated, in order further to stabilize the dry "mix" and the cellular end product as well as to preclude or substantially minimize efflorescence, especially by preventing the formation of magnesium sulphate in the end product, I employ a quantity of calcium hydroxide or slacked lime. This compound, because of its greater affinity for reaction with dissolved compounds containing the sulphate radical in their composition, prevents the formation of efflorescent magnesium sulphate in the final end product.

I shall now endeavor to explain my theory of the reactions occuring in my newly discovered composition of materials but it is to be understood, of course, that I am not to be limited to the specific chemical reactions that I shall now describe or to the sequence of their occurrence. The reactions which I herein propound and which I believe to be correct are solely for the purpose of more fully explaining my invention.

The sodium bicarbonate, when mixed with water and in the presence of the calcium sulphate or gypsum, which constitutes the major ingredient of my composition, liberates carbon dioxide gas. In the presence of gypsum and water alone smaller amounts of carbon dioxide gas will be liberated from a predetermined quantity of sodium bicarbonate than when certain other substances are present and, therefore, in order to produce a cellular mass of very light structure a larger quantity of sodium bicarbonate would necessarily have to be employed in the absence of such other substances. In order to reduce to a minimum the sodium bicarbonate content of my mixture and, at the same time, ensure substantially complete liberation of the latent carbon dioxide therefrom and so that the liberated gas may be more effectively entangled, I employ a water-soluble silicofluoride compound of a bi-valent metal which preferably is magnesium silicofluoride. This latter substance yields an acid reaction on decompositioned and hydrolysis and consequently causes substantially all of the carbon dioxide gas to be liberated from the sodium bicarbonate content. I have found that magnesium silicofluoride not only precludes a too rapid rate of liberation of the carbon dioxide gas and thereby regulates and controls the generation of this gas so that all of it will be useful in expanding the plastic mass to produce a cellular structure but, in addition to the foregoing functions performed by the magnesium silicofluoride content, this material, which is water soluble of itself, liberates a gas which augments the carbon dioxide gas liberated from the sodium bicarbonate. Moreover, the magnesium silicofluoride acts as a hardening agent for the cellular structure thus rendering it highly desirable as a building material as well as for heat and sound insulation purposes. From the foregoing, it will be noted that the gases liberated by the addition of water to the prepared dry mixture result from the reaction between the calcium sulphate or gypsum and two dissimilar water-soluble materials—namely, sodium bicarbonate and magnesium silicofluoride—thereby liberating two dissimilar gases. The combination of these materials produces a soft plastic mass which, after setting, hardens into a cellular structure possessing a high structural value.

As hereinbefore mentioned, powdered soap bark, which is preferably used, acts as a foam producer and the gases generated in situ beat the plastic mass into a foam which retains effectively the liberated gases thereby producing a permanent cellular structure.

I have found that by employing magnesium silicofluoride the quantity of sodium bicarbonate required may be reduced under the quantity that would otherwise be required since substantially all of the latent gas inhering in the sodium bicarbonate is liberated. Another advantage flowing from the use of magnesium silicofluoride, which as stated is an acid reacting soluble salt, is that the reaction between it and the sodium bicarbonate content produces a gelatinous precipitate of silica hydrate, which latter upon the aging of the finishing product becomes crystalline and further strengthens the same structurally and renders it unnecessary in mixing my composition of materials to employ such exact proportions of water during the gauging as would otherwise be required. This results in accomplishing the precipitation of silica in situ and substantially prevents disintegration of the cellular structure when exposed to the atmosphere.

In mixing up the ingredients of my composition I may vary their proportions with respect to one another in order to produce cellular masses having different weights per unit of volume. I have found that in order to produce cellular masses of extremely light weight per unit of volume the sodium bicarbonate content, as well as the magnesium silicofluoride content, should be increased, and likewise the soap bark content. The calcium hydroxide content may remain fixed in amount for the different weights per unit of volume of the cellular masses. In producing a cellular structure possessing a weight of approximately 24 pounds per cubic foot, I employ the ingredients referred to above in substantially the following proportions:

| | Parts. |
|---|---|
| Calcined gypsum | 100 |
| Sodium bicarbonate | 1.75 |
| Magnesium silicofluoride | 2. |
| Calcium hydroxide | 0.5 |
| Powdered soap bark | .05 |

If it is desired to produce a cellular structure possessing a weight of approximately 12 pounds per cubic foot, I employ the ingredients in substantially the following proportions:

| | Parts. |
|---|---|
| Calcined gypsum | 100 |
| Sodium bicarbonate | 2.8 |
| Magnesium silicofluoride | 3.0 |
| Calcium hydroxide | .5 |
| Powdered soap bark | .12 |

By variably proportioning these ingredients, I am able to produce cellular structures, the weights of which may be varied per unit of volume, as desired.

My improved cellular gypsum product can either be manufactured in the plant and marketed as such in the form of blocks, sheets, slabs, etc. or a prepared dry mix of the reacting materials can be marketed in powdered form in boxes or other containers and the desired cellular partitions, blocks, ceilings, floor and roof fillings, etc. may be formed in situ by the mere gauging of the same with water and pouring or casting the same. The materials which I employ are peculiarly adapted for sale as a dry mix as they are relatively non-corrosive to the containers, are unobjectionable in handling and can be stored without substantial deterioration for long periods of time. Furthermore upon the addition of water thereto in the proper proportions a flowable plastic mass of just the right consistency is obtained which can be poured into suitable molds and the desired cellular structure thereby formed in situ.

While I prefer soap bark as the foam-producing or gas-entangling agent, other known agents as glue, dextrine or gum arabic and the like may be employed if desired as such an agent, either alone or in conjunction therewith or in admixture with each other.

While I have described in detail my invention, it is to be understood that I do not desire to be limited to the specific proportions and materials except as such limitations may be required by the claims hereof.

I claim:

1. A cellular product resulting from the gauging with water of a mixture comprising partially calcined gypsum as the major ingredient, a water-soluble carbonate, and a water-soluble silicofluoride compound of a bi-valent metal.

2. A cellular product resulting from the gauging with water of a mixture comprising partially calcined gypsum as the major ingredient, a water-soluble carbonate, and magnesium silicofluoride.

3. A cellular product resulting from the gauging with water of a mixture comprising partially calcined gypsum as the major ingredient, sodium bicarbonate, magnesium silicofluoride, and a foam-producing agent.

4. A cellular product resulting from the gauging with water of a mixture comprising partially calcined gypsum as the major ingredient, sodium bicarbonate, magnesium silicofluoride, and soap bark.

5. A cellular product resulting from the gauging with water of a mixture comprising partially calcined gypsum as the major ingredient, sodium bicarbonate, magnesium silicofluoride, soap bark, and calcium hydroxide.

6. A cellular product resulting from the gauging with water of a mixture comprising partially calcined gypsum as the major ingredient, a water-soluble carbonate, a water-soluble silicofluoride compound of a bi-valent metal, and a foam-producing agent.

7. A dry mix comprising a finely divided material which will set on the addition of water as the major ingredient, a water soluble carbonate, and a water-soluble, silicofluoride compound of a bi-valent metal.

8. A dry mix comprising finely divided partially calcined gypsum, a water-soluble carbonate, and magnesium silicofluoride.

9. A dry mix comprising partially calcined gypsum as the major ingredient, sodium bicarbonate, magnesium silicofluoride, soap bark, and calcium hydroxide.

10. A new composition of matter consisting of a dry pulverized mixture comprising plaster of Paris as the major ingredient, substantially not more than 3% of sodium bicarbonate, substantially not more than 3% of magnesium silicofluoride, substantially .5% of calcium hydroxide, and substantially not more than 0.15% of soap bark.

11. A new composition of matter consisting of a dry pulverized mixture comprising plaster of Paris as the major ingredient, substantially not more than 3% of an alkali metal bicarbonate, substantially not more than 3% of a water soluble silicofluoride compound of bi-valent metal, and substantially .5% of calcium hydroxide.

In witness whereof, I have hereunto subscribed my name.

HARRY E. BROOKBY.